Feb. 17, 1931.  J. W. TAYLOR  1,792,942

KNIFE EDGE BEARING OF WEIGHING APPARATUS

Filed Jan. 29, 1929

Inventor: John William Taylor
Per: George E. Folkes
Attorney

Patented Feb. 17, 1931

1,792,942

UNITED STATES PATENT OFFICE

JOHN WILLIAM TAYLOR, OF BIRMINGHAM, ENGLAND, ASSIGNOR TO W. & T. AVERY LIMITED, OF SOHO FOUNDRY, BIRMINGHAM, ENGLAND

KNIFE-EDGE BEARING OF WEIGHING APPARATUS

Application filed January 29, 1929, Serial No. 335,965, and in Great Britain February 8, 1928.

This invention has reference to improvements in or relating to the knife-edge bearings of weighing apparatus.

In connection with automatic and semi-automatic weighing apparatus it is the general practice to prevent the longitudinal displacement of the fulcrum knife-edges of the levers and/or the indicating mechanism by means of plates secured to the ends of the brackets carrying the bearing blocks which cooperate with the knife-edges.

It is found in practice, however, particularly where the weighing apparatus is provided with means for lifting the knife-edges from the bearing blocks and locking them in their raised position, that there is a tendency, during the raising or re-engagement of the knife-edges from or with their co-operating bearing blocks, for a longitudinal displacement of the knife-edges relatively to said bearing blocks thereby entailing the possibility of the chipping of the ends of the knife-edges.

The present invention has for its object the provision of means for eliminating the possibility of the chipping of the ends of the knife-edges due to a longitudinal displacement thereof.

The invention consists of an improved knife-edge bearing for use with weighing apparatus, characterized by the provision at each end of the knife-edge of a resilient member adapted, by virtue of its resilience, to maintain itself in constant abutment with the respective adjacent end of the knife-edge preferably both when the knife-edge is resting on or raised from the co-operating bearing block, for the purpose of preventing the chipping of the knife-edge.

The invention will now be described with particular reference to the accompanying sheet of drawings, wherein:—

Figure 1:
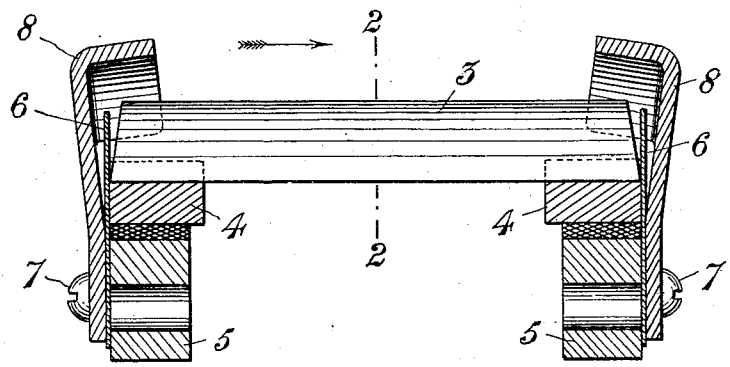
Figure 2:
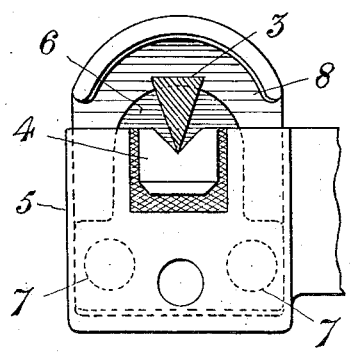

Figure 1 is a view mainly in longitudinal vertical section illustrating the fulcrum knife-edge of a weighing scale of known kind mounted in bearings constructed in accordance with the invention, and Figure 2 is a transverse sectional view taken on a plane indicated by the line 2—2 of Figure 1 looking in the direction of the arrow in the said figure.

The fulcrum knife-edge 3 is supported in bearing blocks 4 carried by a pair of brackets 5 supported from the frame of the scale. The outer face of each of the brackets 5 has secured thereto the lower end of a resilient strip-steel member 6 the upper portions whereof project above the bearing blocks 4 and abut the respective adjacent ends of the knife-edge 3. These resilient members 6 are maintained in position by the screws 7 which also serve to secure in position the hooded end caps 8 commonly provided at each end of the knife-edge for preventing damage to the said knife-edge, the upper portions of the hooded end caps 8 being bent away from the ends of the knife-edge along lines located in substantially the same plane as the bottom of the bearing blocks in order to permit of the flexure of the resilient members 6 as and when required.

The resilient members are made of such a length that they remain in contact with the ends of the knife-edge 3 when the said knife-edge is raised from off the co-operating bearing blocks 4.

It will be appreciated that the said strip-steel members 6 remain in continuous contact with the ends of the knife-edge 3 by virtue of the inherent resilience of the said members and hence, in the event of a lateral shock being imparted to the knife-edge 3, the strip members 6 flex without moving out of contact with the adjacent edges of the knife-edge and thereby obviate the chipping of the knife-edge. At the same time it will be understood that the resistance of the resilient members 6 is sufficient to counteract the tendency to any major longitudinal displacement of the knife-edge 3.

What I claim is:—

1. A knife edge bearing for use with weighing apparatus comprising bearing blocks, means for supporting the said bearing blocks from the weighing apparatus, resilient strip steel members anchored at their lower ends to a fixed support and having upper portions which project above the upper surface of the bearing blocks said members abutting the ends of the knife edge and being adapted by virtue of their resiliency and length to maintain themselves in constant abutment with the respective adjacent ends of the knife edge preferably both when the knife edge is resting on or raised from the co-operating bearing blocks for the purpose of preventing the chipping of the knife edge.

2. A knife-edge bearing comprising bearing blocks, fixed supports for said bearing blocks, resilient strip steel members anchored at their lower ends to the said supports the upper portions of the strip steel members abutting the ends of the knife edges and being adapted by virtue of their resilience to maintain themselves in constant abutment with the respective adjacent ends of the knife-edge preferably both when the knife-edge is resting on or raised from the co-operating bearing blocks for the purpose of preventing the chipping of the knife-edge and nib plates secured to the fixed support and having upper portions thereof inclined outwardly for the purpose of admitting of the flexure of the resilient strip steel members.

In testimony whereof, I have signed my name to this specification.

JOHN WILLIAM TAYLOR.